(No Model.)

J. GEIGER.

SOLDERING EAVES TROUGHS.

No. 271,057. Patented Jan. 23, 1883.

Attest:
T. Walter Fowler
H. B. Applewhaite

Inventor;
Jacob Geiger
per atty.
A. H. Evans & Co.

UNITED STATES PATENT OFFICE.

JACOB GEIGER, OF BUCYRUS, OHIO.

SOLDERING EAVES-TROUGHS.

SPECIFICATION forming part of Letters Patent No. 271,057, dated January 23, 1883.

Application filed October 30, 1882. (No model.)

*To all whom it may concern:*

Be it known that I, JACOB GEIGER, of Bucyrus, in the county of Crawford and State of Ohio, have invented new and useful Improvements in Holders for Eaves-Troughs while being Soldered; and I do hereby declare that the following is a full, clear, and exact description thereof, which will enable those skilled in the art to make and use the same, reference being had to the accompanying drawings, forming part of this specification.

The present invention relates to a new and improved holder for eaves-troughs while being soldered, whereby the work can be accomplished with much greater facility and much more evenly and better than by the methods heretofore practiced, as will be obvious from the following detailed description thereof, reference being had to the accompanying drawings, in which—

Figure 1:
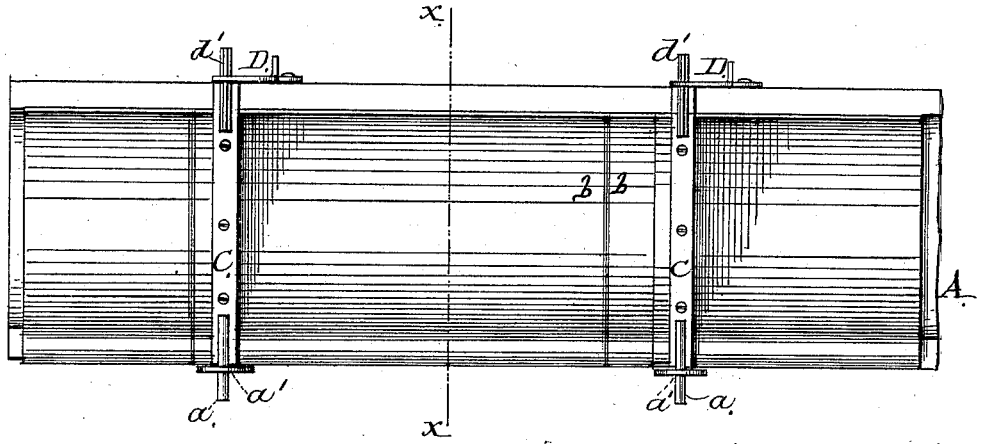
Figure 2:
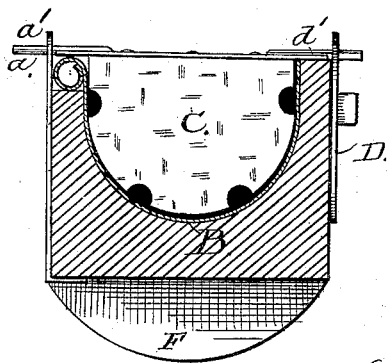
Figure 3:
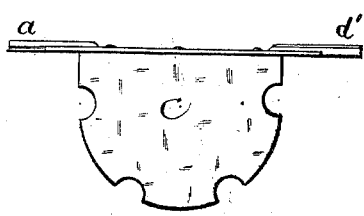
Figure 4:

Figure 1 is a plan or top view; Fig. 2, a transverse vertical section in the plane of $x\ x$ of Fig. 1; and Figs. 3 and 4 are detail views, to be hereinafter referred to.

A in the drawings represents the holder for the eaves-trough while being soldered, which consists of a hollow concave bed, B, corresponding in transverse section to the shape of the trough which is placed in it, with the two ends $b\ b$ of its sections, which are to be soldered together, overlapping each other, in which position they are firmly held by clamps C C, secured by rods $a$ and eyes $a'$ to one side of the bed B, and of suitable shape, that when swung down to and upon the eaves-trough they will firmly bind the same around and in the concave bed B. These clamps are made with their binding-surface regularly curved, and in order to prevent undue binding of said clamps, owing to frequent irregularities in the tin, they are provided with scallops, as shown in Fig. 3, thereby making fewer points of contact with the metal. Actual practice shows this form of clamp to be the more efficient, and particularly so when the clamp is pressed into its position by the adjusting hook D, which is provided with a serrated or roughened cam-face or incline, $d$, fitting over the bar $d'$, by which means the clamps may be forced down and adjusted to suit the different thickness of tin. By my mode of attaching the clamps I avoid the use of hinges, and my device is readily taken apart for packing.

The trough-holder is supported near each end upon rigidly-attached rockers F, whereby the trough-holder can be turned sufficiently to enable the solder to flow freely and level itself upon the joint of the trough.

From the above description it is plainly to be seen that the soldering of the eaves-trough can be accomplished with the utmost facility and in a much better manner than the ordinary mode heretofore practiced, and, furthermore, rendered much stronger and more durable, the importance of all which is obvious.

I am aware that holders for eaves-troughs have been made to rock by means of circular ribs at each end running in circular grooves cut in supporting-pieces at each end; but such is not my invention.

Having thus described my invention, what I claim as new, and desire to secure by Letters Patent, is—

The combination of the holder A, provided with the eyes $a'$, and adjusting-hooks D, provided with the inclined faces $d$, and the scalloped clamps C, each provided with the rod $a$ and bar $d'$, substantially as and for the purpose herein shown and described.

JACOB GEIGER.

Witnesses:
S. R. HARRIS,
JOHN H. STURGEON.